(12) United States Patent (10) Patent No.: US 11,756,315 B2
Schmidt et al. (45) Date of Patent: Sep. 12, 2023

(54) METHOD FOR CLASSIFYING AN UNDERLYING SURFACE

(71) Applicant: DEERE & COMPANY, Moline, IL (US)

(72) Inventors: Martin Schmidt, Mannheim (DE); Norbert Fritz, Ilvesheim (DE)

(73) Assignee: DEERE & COMPANY, Moline, IL (US)

( * ) Notice: Subject to any disclaimer, the term of this patent is extended or adjusted under 35 U.S.C. 154(b) by 230 days.

(21) Appl. No.: 17/067,865

(22) Filed: Oct. 12, 2020

(65) Prior Publication Data

US 2021/0122358 A1 Apr. 29, 2021

(30) Foreign Application Priority Data

Oct. 29, 2019 (DE) .......................... 102019216618.0

(51) Int. Cl.
*B60W 30/02* (2012.01)
*G06V 20/56* (2022.01)
(Continued)

(52) U.S. Cl.
CPC ........... *G06V 20/588* (2022.01); *B60W 10/04* (2013.01); *B60W 10/10* (2013.01); *B60W 10/12* (2013.01); *B60W 10/30* (2013.01); *B60W 30/02* (2013.01); *B60W 40/06* (2013.01); *G01B 11/30* (2013.01); *G06F 18/2431* (2023.01);
(Continued)

(58) Field of Classification Search
CPC ...... B60W 30/02; B60W 10/04; B60W 10/10; B60W 10/12; B60W 10/30; B60W 40/06; B60W 2300/152; B60W 2420/42; B60W 2552/05; B60W 2710/0644; B60W 2710/1005; B60W 2710/125;
(Continued)

(56) References Cited

U.S. PATENT DOCUMENTS

| 5,362,177 A * | 11/1994 | Bowhall | ............... E01C 19/006 |
| | | | 404/101 |
| 2004/0148057 A1 * | 7/2004 | Breed | ................... G01S 7/4802 |
| | | | 700/242 |

(Continued)

FOREIGN PATENT DOCUMENTS

DE 102018109965 A1 6/2019

OTHER PUBLICATIONS

European Search Report issued in counterpart application No. 20198121.4 dated Mar. 12, 2021 (8 pages).

*Primary Examiner* — Jonathan M Dager
*Assistant Examiner* — Jean W Charleston
(74) *Attorney, Agent, or Firm* — Taft Stettinius & Hollister LLP; Stephen F. Rost

(57) ABSTRACT

A method for classifying an underlying surface travelled by an agricultural utility vehicle includes acquiring a detail of a surface of the underlying surface in the form of optical data, classifying the optical data in a data processing unit with respect to different underlying surface classes, and determining an underlying surface class on the basis of the classifying step. Output data is output from the data processing unit representative of the determined underlying surface class as a classification result. A technical feature of the utility vehicle is adapted as a function of the classification result.

19 Claims, 1 Drawing Sheet

(51) Int. Cl.
*B60W 10/04* (2006.01)
*B60W 10/10* (2012.01)
*B60W 10/12* (2012.01)
*B60W 10/30* (2006.01)
*B60W 40/06* (2012.01)
*G01B 11/30* (2006.01)
*G06F 18/2431* (2023.01)

(52) U.S. Cl.
CPC ............... *B60W 2300/152* (2013.01); *B60W 2420/42* (2013.01); *B60W 2552/05* (2020.02); *B60W 2710/0644* (2013.01); *B60W 2710/1005* (2013.01); *B60W 2710/125* (2013.01); *B60W 2710/30* (2013.01); *B60W 2720/00* (2013.01); *B60W 2756/00* (2020.02)

(58) Field of Classification Search
CPC ......... B60W 2710/30; B60W 2720/00; B60W 2756/00; G01B 11/30; G06K 9/628; G06V 20/588
USPC .......................................................... 701/48
See application file for complete search history.

(56) References Cited

U.S. PATENT DOCUMENTS

| | | | |
|---|---|---|---|
| 2005/0087378 A1* | 4/2005 | Hrazdera | B60K 28/16 180/170 |
| 2017/0253093 A1* | 9/2017 | Baum | B60C 23/002 |
| 2017/0339822 A1* | 11/2017 | Gresch | B62D 6/002 |
| 2018/0266829 A1 | 9/2018 | Fritz et al. | |
| 2018/0312063 A1 | 11/2018 | Woopen et al. | |
| 2018/0332760 A1* | 11/2018 | Gresch | A01B 63/111 |
| 2019/0126912 A1* | 5/2019 | Peterson | A01B 63/22 |
| 2019/0129435 A1* | 5/2019 | Madsen | G05D 1/0274 |
| 2019/0139335 A1* | 5/2019 | Morawitz | G07C 5/0825 |
| 2019/0146511 A1* | 5/2019 | Hurd | G06F 18/251 701/27 |
| 2019/0382005 A1* | 12/2019 | Nishi | G01S 7/481 |
| 2019/0387658 A1* | 12/2019 | Henry | A01B 76/00 |
| 2020/0200894 A1* | 6/2020 | Boydens | G06Q 10/00 |
| 2020/0319632 A1* | 10/2020 | Desai | B60P 1/00 |

\* cited by examiner

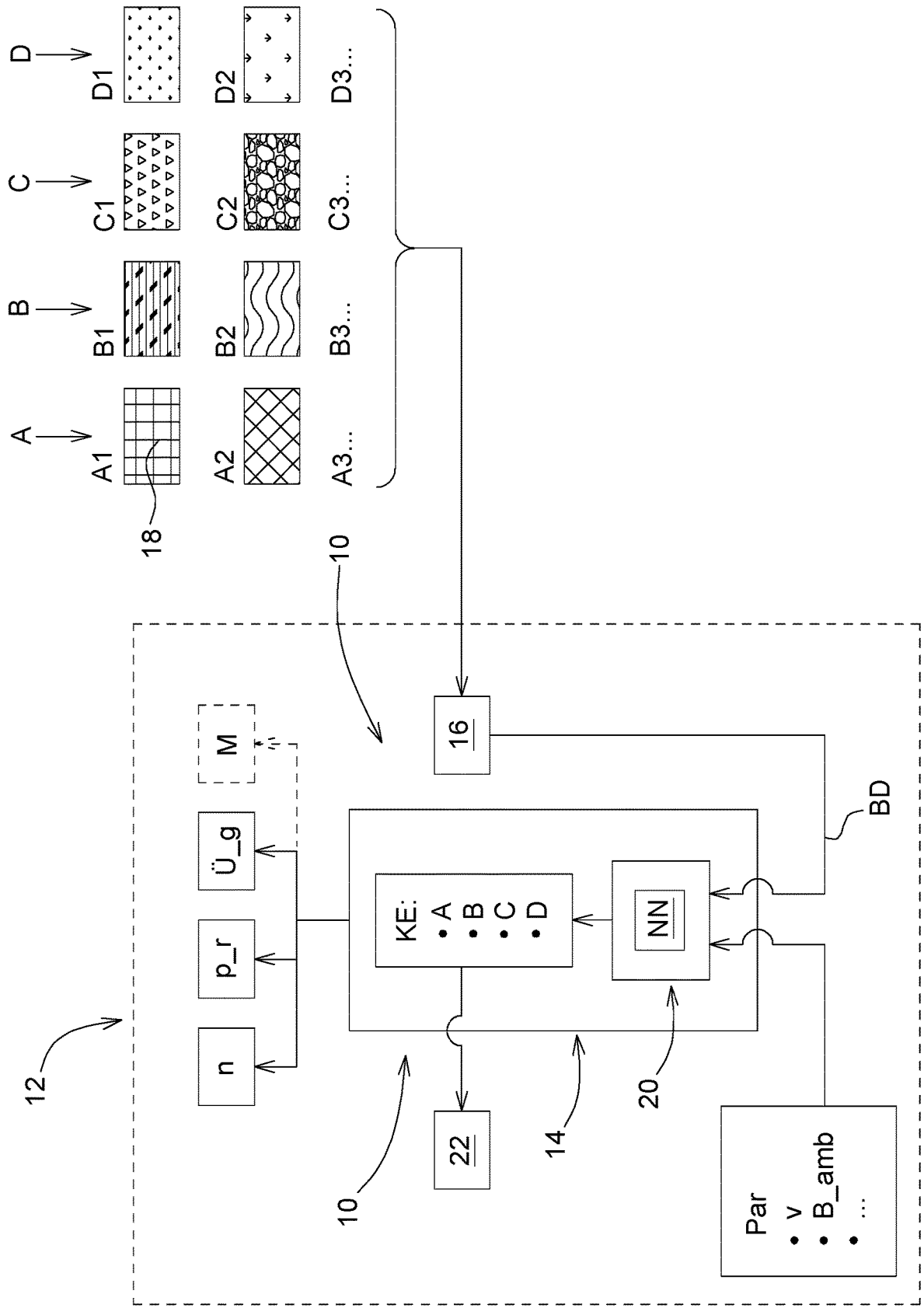

METHOD FOR CLASSIFYING AN UNDERLYING SURFACE

RELATED APPLICATIONS

This application claims priority to German Application No. 102019216618.0, filed Oct. 29, 2019, the disclosure of which is hereby expressly incorporated by reference in its entirety.

FIELD OF THE DISCLOSURE

The present disclosure relates to a method for classifying an underlying surface, which an agricultural utility vehicle uses for its driving operation.

BACKGROUND

The quality of the travelled underlying surface changes often during the driving operation and working use in the case of agricultural utility vehicles. The vehicle driver then attempts to adapt the way of driving of the utility vehicle accordingly.

There is a need for adapting the way of driving an agricultural utility vehicle as efficiently as possible to the respective underlying surface.

SUMMARY

According to the present disclosure, an underlying surface on which an agricultural utility vehicle is travelling is classified by the method. A detail of a surface of the underlying surface is acquired here in the form of optical data. These optical data are supplied to a data processing unit and processed therein in particular by specific algorithms and classified at the same time with respect to different underlying surface classes. An applicable underlying surface class is determined on the basis of the classification. The determined underlying surface class is a classification result which is represented by output data of the data processing unit. A technical feature of the utility vehicle is adapted as a function of the classification result. The technical feature includes at least one of a tire pressure, a transmission gear ratio, an engine speed, an actuation state of an activatable front axle drive, and an actuation state of a switchable differential lock.

A technical aid for sufficiently accurate recognition or classification of the travelled underlying surface is provided by this method. The classification result itself in the form of output data of the data processing unit forms an advantageous output base for measures which can be automatically initiated by a control unit, for example. These can be, for example, technical measures on the utility vehicle to adapt its driving operation optimally to the recognized underlying surface automatically. The method thus also offers an assistance and comfort function for the driver or user, so that he is significantly relieved during the driving operation and working use. Such an automatic adaptation of the vehicle to the respective underlying surface additionally acts to save fuel and reduce wear.

An optical sensor system is designed in such a way that the respective surface detail of the underlying surface is optically acquired in the form of image data. These data may be processed in a technically simple manner and offer a broadly scattered measured surface. In addition, the image data enable a high accuracy and high level of data plausibility, which assists the quality of the classification result.

In one embodiment, the data processing unit contains at least one neural network so that the optical data can be processed on the one hand, reliably with high accuracy and, on the other hand, with low technical expenditure. Such an artificial intelligence only requires a specific definition phase and a specific learning phase (training phase) until it can supply sufficiently accurate output data for correct classification and can then be used in everyday work of the utility vehicle as a technical model or replacement for otherwise complex technical means. In this way, neural networks may also advantageously be applied for an evaluation of the data according to the method of the optical sensor system and therefore for recognizing or classifying the acquired underlying surface.

The at least one neural network or the data processing unit can also be designed in such a way that it also works like continuously optimizing, self-learning software in practical use of the utility vehicle (i.e., after the original learning phase before the practical use).

In one embodiment, a neural network which receives the data of the optical sensor system as input signals is used in the data processing unit. To assist the operational safety and reliability in the classification of the underlying surface, the data processing unit has a checking stage in which data (for example, the data of the optical sensor system, input data, or output data of a neural network) are checked for their plausibility. For example, this check is performed in that the respective data are compared to predefined plausibility data.

The acquired underlying surface is qualitatively assigned to one specific underlying surface class of multiple possible underlying surface classes. In particular, at least one of the following exemplary underlying surface classes is provided for the classification:

paved underlying surface (e.g., cobblestones, tarmac, asphalt), unpaved underlying surface (e.g., gravel, sand, crushed rock), farmland or field, pasture (e.g., grassy field, herbal meadow).

The above underlying surface classes can additionally be subclassified for this purpose, for example, with respect to a farmland or field quality, specifically with respect to properties such as solid, muddy, sandy, or loamy.

The optical data are advantageously processed in the data processing unit as a function of at least one acquired parameter. Additional reasonable criteria can be taken into consideration in the driving operation of the utility vehicle in this way, in order to improve the accuracy of the classification result. In particular, at least one of the following variables is suitable as a parameter: a travel velocity of the utility vehicle or an environmental condition (for example, weather parameter, visibility conditions, position-related field data).

As already mentioned, the classification result can be used as an output base for specific measures on the utility vehicle. In particular, a specific technical feature of the utility vehicle can be automatically adapted in this case to automatically adapt its driving operation optimally to the identified underlying surface. At least one of the following technical features of the utility vehicle is adapted: the tire pressure of at least one wheel, a transmission gear ratio, an engine speed of the internal combustion engine, the actuating state of an activatable front axle drive or a switchable differential lock (for which purpose additional items of information of a steering angle and the travel velocity are evaluated).

The adaptation of the above-mentioned technical features is performed automatically by a suitable control unit, which automatically triggers a defined measure in dependence on the classification result. Alternatively, the defined measure can be signalled to the driver or user as a proposed action measure (for example, on a display screen or user interface). The proposed measure can then be triggered manually by the driver or user.

An arrangement for classifying an underlying surface travelled by an agricultural utility vehicle has an optical sensor system and a suitable data processing unit.

The optical sensor system (for example, at least one camera) is used for optically acquiring a detail of a surface of the underlying surface in the form of optical data. The optical sensor system is arranged at one point (or distributed at multiple points) of the utility vehicle in such a way that it has a free view of the underlying surface. The optical sensor system is installed here on an outside region of a vehicle cab. The optical sensor system is oriented, for example, on the underlying surface in the travel direction in front of the utility vehicle (for example, front camera). Alternatively or additionally, the optical sensor system is oriented on the underlying surface adjacent to the vehicle (for example, side camera).

The data processing unit of the arrangement can be implemented in a control unit of the utility vehicle, which contains the subunits required for data processing or signal processing such as a read or write unit, storage unit, and processor. The control unit can have subunits which are physically separated from one another or can be arranged as a single block on the utility vehicle. The above-mentioned optical data are processed in the data processing unit and classified with respect to different underlying surface classes. The data processing unit determines an applicable underlying surface class on the basis of the classification. The data processing unit generates output data therefrom, which represent the determined underlying surface class as a classification result.

In this disclosure, the agricultural utility vehicle may be a tractor or hauler.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

The single FIGURE shows an arrangement schematically illustrated in a block diagram having components for carrying out the method according to the present disclosure.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

FIG. 1 shows an arrangement 10 having multiple components for acquiring and classifying an underlying surface travelled by an agricultural utility vehicle 12, in particular a tractor. The arrangement 10 is arranged on the vehicle side and has, inter alia, a control unit 14 and an optical sensor system 16 (for example, a camera). The optical sensor system 16 is fastened on one (or multiple) suitable position(s) of the utility vehicle 12, such as in the front region of the utility vehicle 12 (for example, on an outside region of its vehicle cab).

The control unit 14 contains the subunits required for signal processing or data processing, such as a read or write unit, storage unit, and processor. The control unit 14 can have subunits physically separated from one another or can be implemented as a single block in the utility vehicle 12.

The optical sensor system 16 acquires a detail of a surface of an underlying surface travelled by the utility vehicle 12. For example, a detail of the surface 18 of a paved underlying surface A1 is acquired. The paved underlying surface A1 differs from further paved underlying surfaces which can occur in the driving operation of the utility vehicle 12. In this case, the underlying surfaces A1, A2, A3 are only described as representatives for an indeterminate number of different possible paved underlying surfaces (for example, asphalt road, tarmac, different cobblestones). Similarly, surfaces of different unpaved underlying surfaces (for example, crushed rock path, gravel path, sand path) can be acquired as B1, B2, B3, etc. Differently structured farmland surfaces C1, C2, C3, etc., and differently structured pasture surfaces D1, D2, D3, etc., can also be acquired.

The control unit 14 receives sensor signals of the optical sensor system 16. These sensor signals are sent as raw data or image data BD to the control unit 14. From the received image data BD, a data processing unit 20 determines an underlying surface class (e.g., A, B, C, or D), which is assigned to the acquired surface detail of an underlying surface (for example, A1 to D3). The data processing unit 20 sends output data which represent the determined underlying surface class A or B or C or D as the classification result.

A neural network NN is used for the classification in the data processing unit 20. After a definition and learning phase, it represents a software-based model for correctly determining the underlying surface class, on which the driving operation of the utility vehicle 12 presently takes place. The data processing unit 20 and the neural network NN are designed in such a way that a continuous optimization of the model (self-learning software) also takes place during the driving operation on the basis of the received image data BD and parameter data Par.

At least one parameter Par is also taken into consideration in the processing of the optical data. For example, an acquisition of the travel velocity v of the utility vehicle 12 or at least one ambient condition B_amb (e.g., air temperature, degree of brightness, visibility conditions, position-related field data) is advantageous to increase the accuracy in the classification. The respective parameter value can be determined by a suitable sensor system or is already available, for example, via a data bus (for example, CAN). The value of the respective parameter Par is sent as an input signal to the data processing unit 20.

The classification unit KE is signalled by a display unit 22 to the driver or user. On the basis of this information, the driver or user can then manually trigger a measure to adapt the utility vehicle 12, in particular its driving operation, to the determined underlying surface class A, B, C, or D.

In addition, the classification result KE is used to automatically adapt at least one technical feature of the utility vehicle 12. For example, the engine speed n of an internal combustion engine of the utility vehicle 12 or the tire pressure n of a tire, or a transmission gear ratio Ü_g is automatically adapted by the control unit 14. The adaptation of further features M is conceivable, as indicated by dashed lines in the drawing. These optional features include the actuating state of an activatable front axle drive or a switchable differential lock.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for classifying an underlying surface travelled by an agricultural utility vehicle, comprising:
    acquiring a surface detail of a surface of the underlying surface in the form of optical data wherein the surface detail of the underlying surface is acquired by an optical sensor system fastened to the agricultural utility vehicle;
    acquiring at least one parameter, wherein the at least one parameter is a variable based on an agricultural utility vehicle condition or an environmental condition;
    classifying the optical data of the acquired surface detail as a function of the at least one parameter in a data processing unit with respect to different underlying surface classes, wherein each of the different underlying surface classes include multiple possible underlying surfaces assigned to one of the underlying surface classes based on the acquired surface detail of the underlying surface;
    determining an underlying surface class on the basis of the classifying step, wherein the determined underlying surface class is one specific underlying surface class of the multiple possible underlying surface classes;
    outputting data from the data processing unit representative of the determined underlying surface class as a classification result; and
    adapting a technical feature of the utility vehicle as a function of the classification result, the technical feature including at least one of a tire pressure, a transmission gear ratio, an engine speed, an actuation state of an activatable front axle drive, and an actuation state of a switchable differential lock.

2. The method according to claim 1, wherein the optical data comprises image data.

3. The method according to claim 1, further comprising:
    providing the data processing unit with at least one neural network; and
    processing the optical data with the at least one neural network.

4. The method according to claim 1, wherein the determining step comprises determining the underlying surface class based on the multiple possible underlying surface classes including a paved underlying surface, an unpaved underlying surface, a farmland, or pasture.

5. The method according to claim 1, further comprising processing the optical data in the data processing unit as a function of the acquired at least one parameter.

6. The method according to claim 1, further comprising processing the optical data in the data processing unit as a function of the agricultural vehicle condition or the environmental condition including a travel velocity of the utility vehicle, an ambient condition, or position-related field data.

7. An arrangement for classifying an underlying surface travelled by an agricultural utility vehicle, comprising:
    an optical sensor system fastened to the agricultural utility vehicle for optically acquiring a surface detail of a surface of the underlying surface in the form of optical data, and a data processing unit for classifying the optical data with respect to different underlying surface classes, wherein each of the different underlying surface classes include multiple underlying surfaces, the data processing unit outputting output data which represent a specific one of the different underlying surface classes determined on the basis of the classification as a classification result; and
    a technical feature of the utility vehicle being adapted as a function of the classification result, the technical feature including at least one of a tire pressure, a transmission gear ratio, an engine speed, an actuation state of an activatable front axle drive, and an actuation state of a switchable differential lock.

8. The arrangement according to claim 7, wherein the optical data comprises image data.

9. The arrangement according to claim 7, wherein the data processing unit comprises at least one neural network.

10. The arrangement according to claim 9, wherein the optical data is operably processed with the at least one neural network.

11. The arrangement according to claim 7, wherein the multiple possible underlying surface classes are based on a paved underlying surface, an unpaved underlying surface, a farmland, or pasture.

12. The arrangement according to claim 7, wherein the optical data is operably processed in the data processing unit as a function of at least one acquired parameter.

13. The arrangement according to claim 12, wherein the at least one acquired parameter comprises a travel velocity of the utility vehicle, an ambient condition, or position-related field data.

14. A work vehicle travelling along an underlying surface, comprising:
    a cab;
    a control unit comprising one or more subunits for signal or data processing;
    an optical sensor system coupled to a location on the cab, the optical sensor optically acquiring a surface detail of a surface of the underlying surface in the form of optical data;
    a data processing unit for classifying the optical data with respect to different underlying surface classes, wherein each of the different underlying surface classes include multiple underlying surfaces, the data processing unit outputting output data to the control unit which represent a specific one of the different underlying surface classes determined on the basis of the classification as a classification result; and
    a technical feature of the utility vehicle being adapted as a function of the classification result, the technical feature comprising a tire pressure, a transmission gear ratio, an engine speed, an actuation state of an activatable front axle drive, or an actuation state of a switchable differential lock.

15. The work vehicle according to claim 14, further comprising a neural network for processing the optical data in the data processing unit.

16. The method according to claim 4 wherein the multiple possible underlying surface classes include subclasses with respect to the farmland or to a field quality including solid, muddy, sandy, or loamy.

17. The arrangement according to claim 11 wherein the multiple possible underlying surface classes include subclasses with respect to the farmland or to a field quality including solid, muddy, sandy, or loamy.

18. The work vehicle according to claim 14, wherein the multiple underlying surface classes are based on a paved underlying surface, an unpaved underlying surface, a farmland, or pasture.

19. The work vehicle according to claim 18 wherein the multiple underlying surface classes include subclasses with respect to the farmland or to a field quality including solid, muddy, sandy, or loamy.

* * * * *